United States Patent
Yamada et al.

(10) Patent No.: US 10,877,189 B2
(45) Date of Patent: Dec. 29, 2020

(54) MIRROR PANEL, MIRROR FILM AND DISPLAY SYSTEM

(71) Applicant: Panasonic Intellectual Property Management Co., Ltd., Osaka (JP)

(72) Inventors: Takashi Yamada, Osaka (JP); Hiroshi Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 145 days.

(21) Appl. No.: 16/084,298

(22) PCT Filed: Oct. 7, 2016

(86) PCT No.: PCT/JP2016/004517
§ 371 (c)(1),
(2) Date: Sep. 12, 2018

(87) PCT Pub. No.: WO2017/163287
PCT Pub. Date: Sep. 28, 2017

(65) Prior Publication Data
US 2019/0079221 A1 Mar. 14, 2019

(30) Foreign Application Priority Data
Mar. 25, 2016 (JP) ................ 2016-062866

(51) Int. Cl.
*G02B 5/08* (2006.01)
*G03B 21/60* (2014.01)
(Continued)

(52) U.S. Cl.
CPC ......... *G02B 5/0816* (2013.01); *G02B 5/0205* (2013.01); *G02B 5/0236* (2013.01);
(Continued)

(58) Field of Classification Search
CPC ........ G03B 21/60; H04N 5/74; H04N 9/3141; G02B 5/0816; G02B 5/0808; G02B 5/08;
(Continued)

(56) References Cited

U.S. PATENT DOCUMENTS 4,174,894 A * 11/1979 Fukuhara ........... G03B 7/09972
396/272
7,643,215 B2 * 1/2010 Shin .................... G02B 27/0101
340/438
(Continued)

FOREIGN PATENT DOCUMENTS

CN 1472593 2/2004
JP 6-036049 U 5/1994
(Continued)

OTHER PUBLICATIONS

International Search Report of PCT application No. PCT/JP2016/004517 dated Nov. 29, 2016.
(Continued)

*Primary Examiner* — William R Alexander
(74) *Attorney, Agent, or Firm* — Wenderoth, Lind & Ponack, L.L.P.

(57) ABSTRACT

A mirror panel includes a semitransmissive diffusion part and a reflecting surface. The semitransmissive diffusion part is configured to diffuse first part of incident light via an incident surface and linearly transmit second part of the incident light. The reflecting surface is disposed in contact with or adjacent to the semitransmissive diffusion part, and reflects light transmitted through the semitransmissive diffusion part toward the semitransmissive diffusion part.

18 Claims, 11 Drawing Sheets

(51) Int. Cl.
  *G02B 5/02* (2006.01)
  *H04N 9/31* (2006.01)
  *H04N 5/74* (2006.01)

(52) U.S. Cl.
  CPC ......... *G02B 5/0242* (2013.01); *G02B 5/0278* (2013.01); *G02B 5/0284* (2013.01); *G02B 5/0808* (2013.01); *G03B 21/60* (2013.01); *H04N 5/74* (2013.01); *H04N 9/3141* (2013.01)

(58) Field of Classification Search
  CPC .. G02B 5/0205; G02B 5/0236; G02B 5/0242; G02B 5/0278; G02B 5/0284
  USPC .......................................................... 359/359
  See application file for complete search history.

(56) References Cited

U.S. PATENT DOCUMENTS

| | | |
|---|---|---|
| 2004/0061935 A1 | 4/2004 | Ohsako et al. |
| 2006/0103627 A1 | 5/2006 | Watanabe et al. |
| 2009/0159123 A1* | 6/2009 | Kothari ............. H01L 31/02167 136/256 |
| 2011/0002035 A1 | 1/2011 | Okamoto |
| 2013/0070207 A1* | 3/2013 | Korenaga ............. G02B 27/48 353/31 |
| 2015/0293404 A1* | 10/2015 | Jinbo .................. H01L 21/6835 349/69 |

FOREIGN PATENT DOCUMENTS

| | | |
|---|---|---|
| JP | 3102560 U | 7/2004 |
| JP | 2006-145645 | 6/2006 |
| JP | 2009-156990 | 7/2009 |
| JP | 2011-013537 | 1/2011 |
| JP | 5571895 B | 8/2014 |

OTHER PUBLICATIONS

English Translation of Chinese Search Report dated Jun. 10, 2020 in corresponding Chinese Patent Application No. 201680083665.0.

* cited by examiner

MIRROR PANEL, MIRROR FILM AND DISPLAY SYSTEM

This application is a U.S. national stage application of the PCT International Application No. PCT/JP2016/004517 filed on Oct. 7, 2016, which claims the benefit of foreign priority of Japanese patent application 2016-062866 filed on Mar. 25, 2016, the contents all of which are incorporated herein by reference.

TECHNICAL FIELD

The present disclosure relates to a mirror panel and a mirror film enabling specular reflection and diffuse reflection, and a display system including either the mirror panel or the mirror film.

BACKGROUND ART

PTL 1 discloses an information display device including a projector configured to project image and a display unit configured to display the image. The display unit is configured as a semitransparent mirror including a transparent member having a surface that is not facing a user and is provided with a reflecting layer having a surface that is not facing the user and is provided with a diffusion layer. In the information display device, the reflecting layer of the display unit displays a reflected image and the projector projects image on the diffusion layer provided on a rear end of the display unit. The information display device enables the user to view the reflected image as well as the projected image at the diffusion layer simultaneously from a front of the display unit.

CITATION LIST

Patent Literature

PTL 1: Unexamined Japanese Patent Publication No. 2006-145645

SUMMARY OF THE INVENTION

The present disclosure provides a mirror panel and a mirror film enabling a user to view a reflected image as well as projected image from a projector, and a display system including either the mirror panel or the mirror film and having a small depth.

According to a first aspect of the present disclosure, there is provided a mirror panel. The mirror panel includes a semitransmissive diffusion part and a reflecting surface. The semitransmissive diffusion part is configured to diffuse first part of incident light via an incident surface and linearly transmit second part of the incident light. The reflecting surface is disposed in contact with or adjacent to the semitransmissive diffusion part, and reflects light transmitted through the semitransmissive diffusion part toward the semitransmissive diffusion part.

According to a second aspect of the present disclosure, there is provided a mirror film. The mirror film includes a semitransmissive diffusion part and a reflecting surface. The semitransmissive diffusion part is configured to diffuse first part of incident light via an incident surface and linearly transmit second part of the incident light. The reflecting surface is disposed in contact with or adjacent to the semitransmissive diffusion part, and reflects light transmitted through the semitransmissive diffusion part toward the semitransmissive diffusion part.

According to a third aspect of the present disclosure, there is provided a display system. The display system includes the mirror panel and a projector configured to project image toward the incident surface in the mirror panel.

According to a fourth aspect of the present disclosure, there is provided a display system. The display system includes the mirror film and a projector configured to project image toward the incident surface in the mirror film.

In the mirror panel or the mirror film according to the present disclosure, the reflecting surface specularly reflects first part of incident light and the semitransmissive diffusion part diffusely reflects second part of incident light. The mirror panel or the mirror film can thus display a reflected image as well as projected image from the projector. A user can thus view the reflected image and the projected image from the projector on a display device having a small depth.

DESCRIPTION OF EMBODIMENTS

Exemplary embodiments will now be described in detail with reference to the appropriate drawings. The following description may not include unnecessary details. For example, the description may not include details of already known matters or repeated reference to substantially identical configurations. This is to avoid unnecessary redundancy in the following description and to facilitate understanding by those skilled in the art.

The inventor(s) provide the accompanying drawings and the following description in order for full understanding of the present disclosure by those skilled in the art, without intending to limit the subject matter described in the claims.

First Exemplary Embodiment

1-1. Configuration

Figure 1:
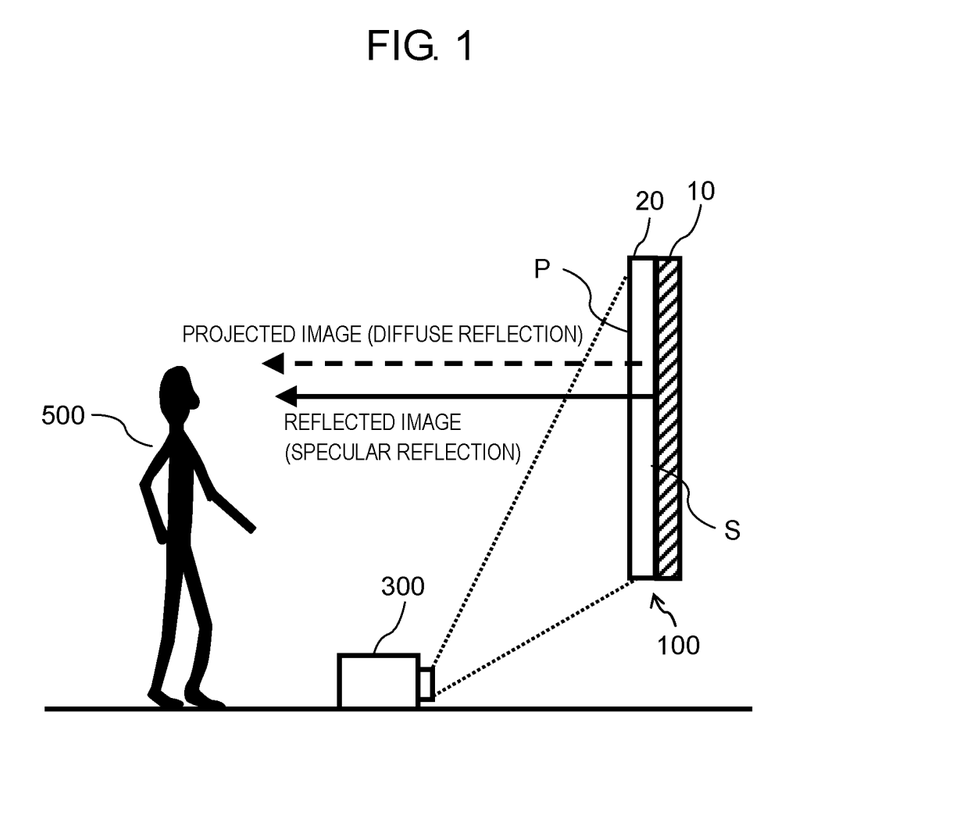
FIG. 1 is a view depicting a configuration of a display system according to the present disclosure.

FIG. 1 is a view depicting a configuration of a display system according to the present disclosure. The display system includes mirror panel 100 and projector 300. Mirror panel 100 has incident surface P via which light enters mirror panel 100. Projector 300 projects image toward incident surface P in mirror panel 100.

Mirror panel 100 includes surface reflecting mirror 10 and transparent screen 20 (exemplifying a semitransmissive diffusion part). Transparent screen 20 in mirror panel 100 is disposed on a light incident side. Surface reflecting mirror 10 has a main face adjacent to transparent screen 20 and provided with reflecting surface S. Transparent screen 20 has translucency so that part of light entering mirror panel 100 via incident surface P is linearly transmitted through transparent screen 20 to reach surface reflecting mirror 10. The reached light is specularly reflected by reflecting surface S of surface reflecting mirror 10 and is linearly transmitted through transparent screen 20 again to be emitted from mirror panel 100. Transparent screen 20 has diffuse reflectivity. Part of light entering mirror panel 100 is thus diffusely reflected in transparent screen 20 to be emitted from mirror panel 100 in various directions.

Figure 2A:
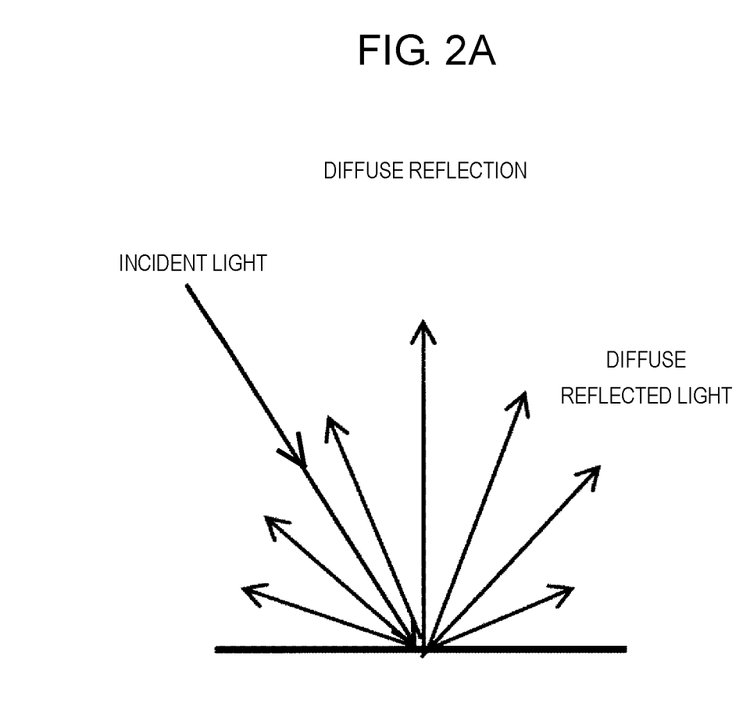
FIG. 2A is an explanatory view of diffuse reflection.

Diffuse reflection indicates reflection of light from an unsmooth surface like a surface having unevenness shape, and is a phenomenon that incident light is reflected at various angles as depicted in FIG. 2A (also called "irregular reflection"). Examples of a reflecting surface having diffuse reflectivity include white paper, frosted glass, and a projection screen for a projector. The present disclosure refers to a diffuse reflecting function achieved as reflection by a semitransmissive reflecting layer having unevenness shape and provided in a transparent medium. The diffuse reflecting function according to the present disclosure is alternatively achieved by diffusion by fine particles dispersed in a transparent medium and reflection by reflecting surface S (to be described in detail later).

Figure 2B:
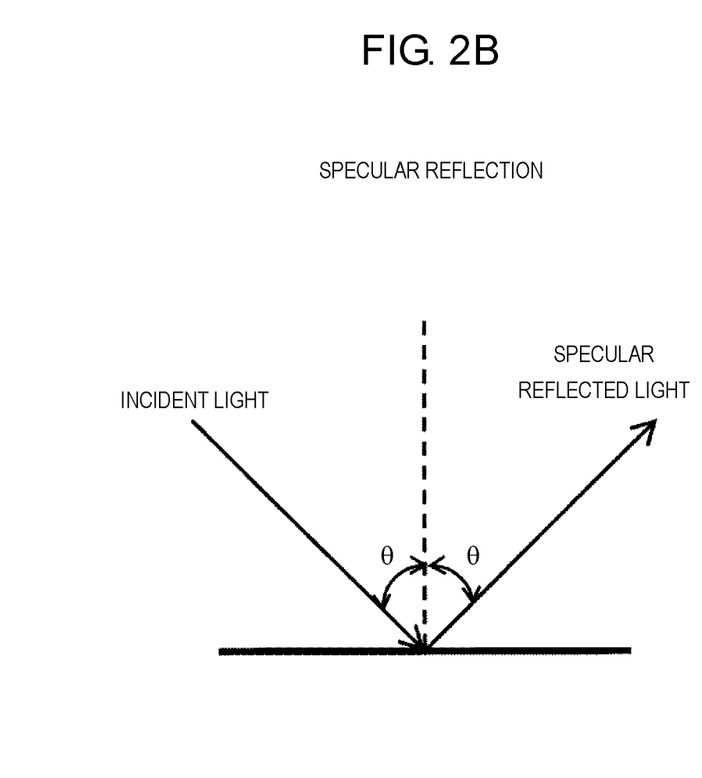
FIG. 2B is an explanatory view of specular reflection.

Reflection by a mirror or the like is called specular reflection (or "regular reflection") in contrast to the diffuse reflection. Specular reflection is a phenomenon that light in a first direction is reflected and emitted in a second direction as depicted in FIG. 2B, and incident angle θ is equal to reflection angle θ.

As described above, part of light entering mirror panel 100 (see FIG. 1) according to the present exemplary embodiment is transmitted through transparent screen 20 and is specularly reflected by surface reflecting mirror 10. This allows user 500 directly facing mirror panel 100 to view his or her own reflected image. Part of light entering mirror panel 100 is diffusely reflected by transparent screen 20 to allow projected image from projector 300 to be displayed on mirror panel 100. User 500 can thus view the projected image.

1-1-1. Mirror Panel

Figure 3:
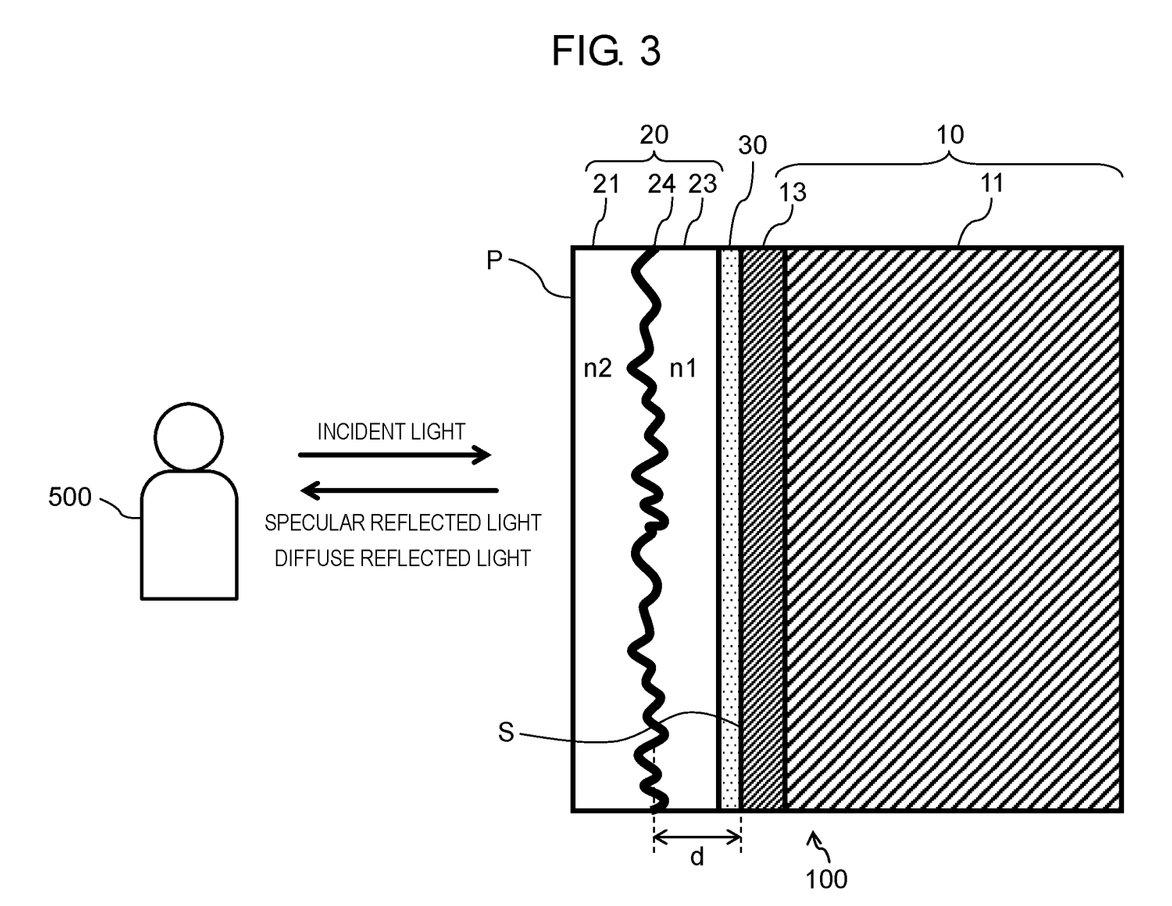
FIG. 3 is a view depicting a configuration of a mirror panel according to a first exemplary embodiment.

FIG. 3 is a view depicting a detailed configuration of mirror panel 100 according to a first exemplary embodiment. As described above, mirror panel 100 includes surface reflecting mirror 10 and transparent screen 20 disposed adjacent to surface reflecting mirror 10. Reflecting surface S of surface reflecting mirror 10 is accordingly disposed adjacent to transparent screen 20. Surface reflecting mirror 10 and transparent screen 20 are bonded together via transparent adhesive layer 30.

(1) Transparent Screen

Transparent screen 20 includes transparent uneven base material 21, semitransmissive reflecting layer (film) 24 provided along an uneven surface of uneven base material 21, and transparent medium layer 23.

Examples of uneven base material 21 include a light diffusion film included in a liquid crystal display or the like. Uneven base material 21 is formed as exemplified below. A transparent liquid adhesive including dispersed transparent spherical fine particles is applied to coat a smooth transparent polyethylene terephthalate (PET) film base material. The applied liquid adhesive is then thermally dried or ultraviolet cured to be firmly fixed. This is an exemplary method of forming uneven base material 21. The following is another exemplary method of forming uneven base material 21. An ultraviolet curing resin is filled between a metal mold having unevenness shape and a transparent base material. Pressure and ultra-violet light are then applied to cure the resin, and the resin and the transparent base material are separated from the metal mold. This is the other exemplary method of forming uneven base material 21.

Semitransmissive reflecting layer 24 is a layer (film) that has a property of reflecting first part of incident visible light and transmitting second part of the light (semitransmissive reflectivity) and is typically called a semitransparent mirror. Semitransmissive reflecting layer 24 is a quite thin film formed to have reflectivity and transmittivity. Semitransmissive reflecting layer 24 can be a film made of metal such as aluminum, nickel, or silver by means of vapor deposition, sputtering, or the like. Semitransmissive reflecting layer 24 has visible light transmittance of 70% or the like. Semitransmissive reflecting layer 24 can alternatively be a dielectric multilayer film made of transparent metal oxides having different refractive indices and stacked alternately. The dielectric multilayer film exemplarily includes niobium pentoxide and silicon dioxide stacked alternately.

Transparent medium layer 23 is provided to tightly embed semitransmissive reflecting layer 24 having unevenness shape. Transparent medium layer 23 is made of a material having a refractive index (n1) identical to or substantially equal to a refractive index (n2) of a material for uneven base material 21. Transparent medium layer 23 is alternatively formed by coating a surface of semitransmissive reflecting layer 24 having unevenness shape with a thermosetting or photosetting transparent resin material to be cured. Transparent medium layer 23 is still alternatively formed by bonding a transparent baseless adhesive film, which is typically included in a liquid crystal display or the like, to the surface of semitransmissive reflecting layer 24 having unevenness shape, to tightly embed semitransmissive reflecting layer 24.

As described above, transparent screen 20 includes semitransmissive reflecting layer 24 having unevenness shape.

(2) Surface Reflecting Mirror

Surface reflecting mirror 10 configured to provide a reflected image includes base material 11 having a smooth surface and reflecting layer 13 provided on the surface of base material 11. As depicted in FIG. 3, base material 11 is disposed to oppose transparent screen 20 via reflecting surface S. Base material 11 is configured by a glass substrate, a resin substrate, a resin sheet, or the like. Base material 11 is optionally flexible. Reflecting layer 13 is formed by coating the surface of base material 11 with aluminum, silver, or the like by means of vapor deposition, sputtering, or the like. Surface reflecting mirror 10 according to the present exemplary embodiment is not configured as a semitransparent mirror but has visible light reflectance of 70% or more, for example. Specifically, reflecting surface S of reflecting layer 13 is not configured as a semitransparent mirror but has visible light reflectance of 70% or more, for example. Base material 11 and reflecting layer 13 can alternatively be made of specularly finished metal. Reflecting surface S corresponds to a metal specular surface in this case.

1-2. Optical Function

Figure 4:
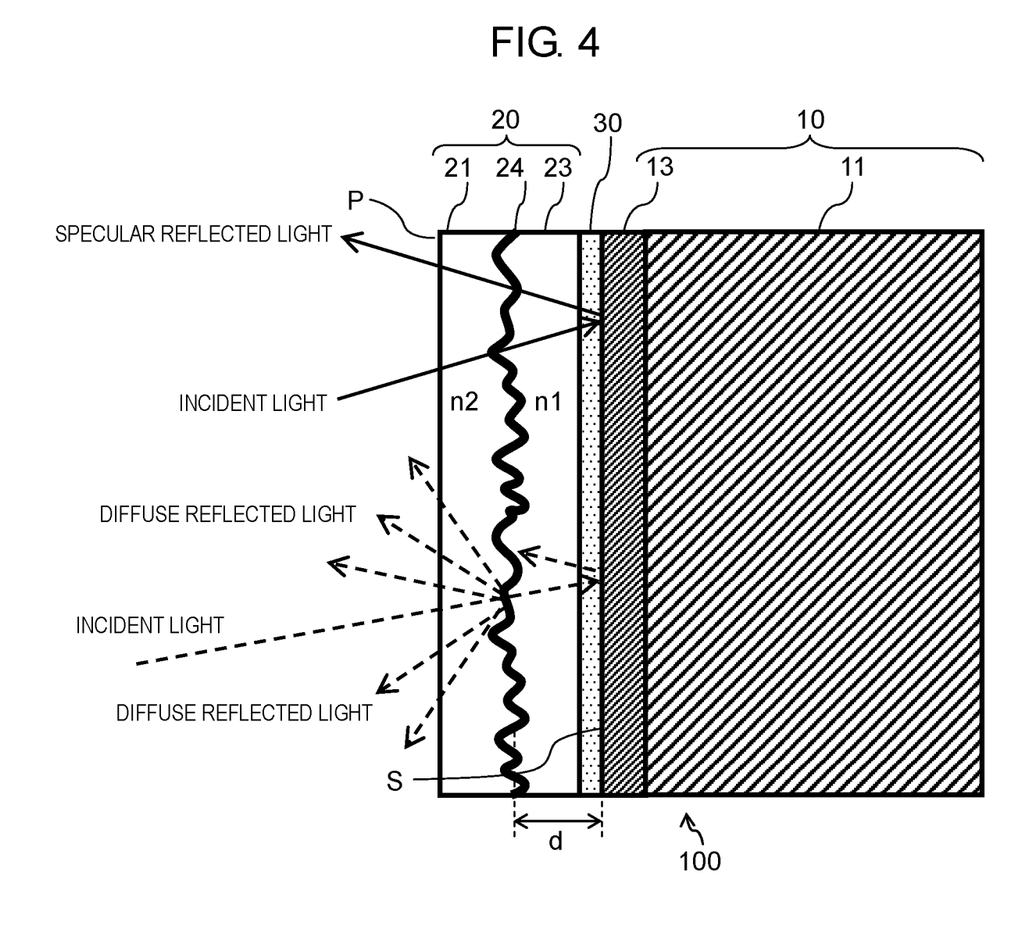
FIG. 4 is an explanatory view of an optical function of the mirror panel according to the first exemplary embodiment.

FIG. 4 is an explanatory view of an optical function of mirror panel 100 according to the first exemplary embodiment. First part of light entering mirror panel 100 via incident surface P is linearly transmitted through transparent screen 20 and is specularly reflected at reflecting surface S of surface reflecting mirror 10. At the same time, second part of the light entering mirror panel 100 is diffusely reflected at semitransmissive reflecting layer 24 having unevenness shape in transparent screen 20. The light specularly reflected and the light diffusely reflected in mirror panel 100 are emitted from mirror panel 100 via incident surface P. As exemplified in FIG. 1, when projector 300 projects image on mirror panel 100 from a front or a side of incident surface P of mirror panel 100, light of the image is diffusely reflected at semitransmissive reflecting layer 24 having unevenness shape in transparent screen 20. The specular reflection allows user 500 directly facing mirror panel 100 to view his or her own reflected image, and the diffuse reflection allows user 500 to view projected image by projector 300.

Projected image by projector 300 may be visually recognized as doubled images when semitransmissive reflecting layer 24 and reflecting surface S form long gap d in mirror panel 100. Mirror panel 100 according to the present exemplary embodiment is configured such that semitransmissive reflecting layer 24 and reflecting surface S form gap d equal to or less than 3 mm in order for prevention of such doubled images (see FIG. 4). Gap d between semitransmissive reflecting layer 24 and reflecting surface S is defined as a gap between a plane obtained by leveling the uneven surface of semitransmissive reflecting layer 24 and reflecting surface S.

Figure 5A:
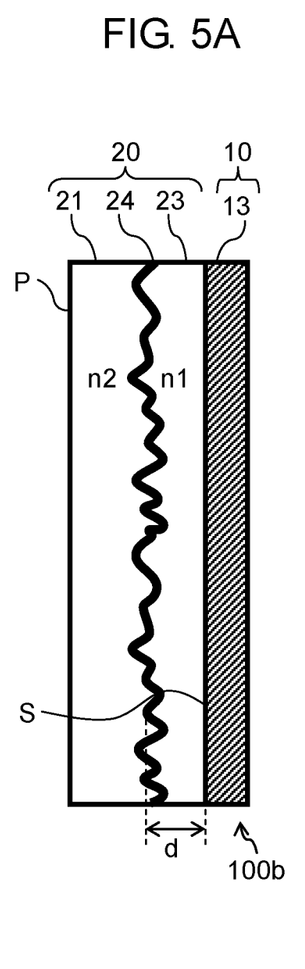
FIG. 5A is a view depicting another exemplary configuration of the mirror panel according to the first exemplary embodiment.
Figure 5B:
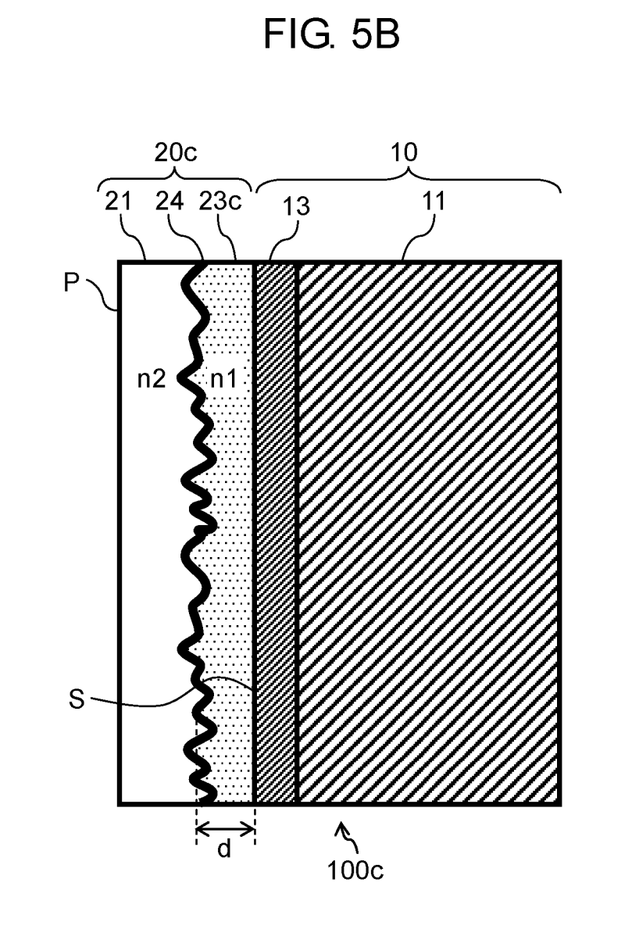
FIG. 5B is a view depicting still another exemplary configuration of the mirror panel according to the first exemplary embodiment.

FIG. 5A and FIG. 5B are views each depicting another exemplary configuration of mirror panel 100 including transparent screen 20 having uneven base material 21 according to the first exemplary embodiment. Mirror panels 100b, 100c depicted respectively in FIG. 5A and FIG. 5B are configured differently from mirror panel 100 depicted in FIG. 3 in that transparent screen 20 and surface reflecting mirror 10 are joined without adhesive layer 30. Reflecting surface S is disposed in contact with transparent screen 20 in this case.

In mirror panel 100b depicted in FIG. 5A, reflecting layer 13 is configured by a metal film made of metal such as aluminum or silver and provided on a smooth surface opposite to incident surface P of transparent screen 20 by means of vapor deposition, sputtering, or the like. In this exemplary configuration, surface reflecting mirror 10 does not include base material 11. Mirror panel 100b thus enables transparent screen 20 and surface reflecting mirror 10 to be joined without adhesive layer 30.

In mirror panel 100c depicted in FIG. 5B, transparent medium layer 23c in transparent screen 20c is configured by a baseless adhesive film. Semitransmissive reflecting layer 24 having unevenness shape is bonded to transparent medium layer 23c so as to be tightly embedded therein. Transparent medium layer 23c has a first surface opposite to a second surface bonded to semitransmissive reflecting layer 24. Mirror panel 100c is formed by bonding the first surface to a surface of surface reflecting mirror 10 (a surface of reflecting layer 13, i.e., reflecting surface S). Transparent medium layer 23c thus serves as an adhesive layer in this case.

Each of the configurations depicted in FIG. 5A and FIG. 5B also achieves a mirror panel having translucency and diffuse reflectivity and configured to display a reflected image and projected image from a projector.

1-3. Effects and Other Benefits

As described above, mirror panel 100, 100b, 100c according to the present exemplary embodiment includes transparent screen 20, 20c (exemplifying the semitransmissive diffusion part) and reflecting surface S. Transparent screen 20, 20c is configured to diffuse first part of incident light via incident surface P and linearly transmit second part of the incident light. Reflecting surface S is disposed in contact with or adjacent to transparent screen 20, 20c, and reflects light transmitted through transparent screen 20, 20c toward transparent screen 20, 20c.

First part of light entering mirror panel 100, 100b, 100c thus configured is transmitted through transparent screen 20, 20c and is specularly reflected at reflecting surface S, to allow user 500 directly facing mirror panel 100, 100b, 100c to view his or her own reflected image. Second part of the light entering mirror panel 100, 100b, 100c is diffusely reflected at transparent screen 20, 20c, to allow user 500 to view projected image from projector 300 onto transparent screen 20, 20c.

Mirror panel 100, 100b, 100c according to the present exemplary embodiment is configured to specularly reflect and diffusely reflect incident light, and thus does not need any own light source, power supply, or wiring. Mirror panel 100, 100b, 100c can thus have a smaller depth than that of a display device necessarily including a light source, a power supply, and a wiring.

Semitransmissive reflecting layer 24 and reflecting surface S can form a gap equal to or less than 1 mm in surface reflecting mirror 10. This configuration further inhibits doubled images. Surface reflecting mirror 10 having high visible light reflectance (e.g. 70% or more) may be combined with transparent screen 20. This configuration allows user 500 to simultaneously view a clear reflected image and projected image. Transparent screen 20, 20c may have visible light linear transmittance set to 50% or more, for example. This configuration achieves a clear reflected image.

In a mirror panel applied for reflection or transmission of infrared light, infrared light reflectance of reflecting surface S and infrared light linear transmittance of transparent screen 20, 20c may be set to necessary values.

Second Exemplary Embodiment

The first exemplary embodiment provides the diffusely reflecting function of transparent screen 20 that configures a mirror panel by using semitransmissive reflecting layer 24 having unevenness shape. The present exemplary embodiment provides another configuration achieving the diffusely reflecting function.

Figure 6:
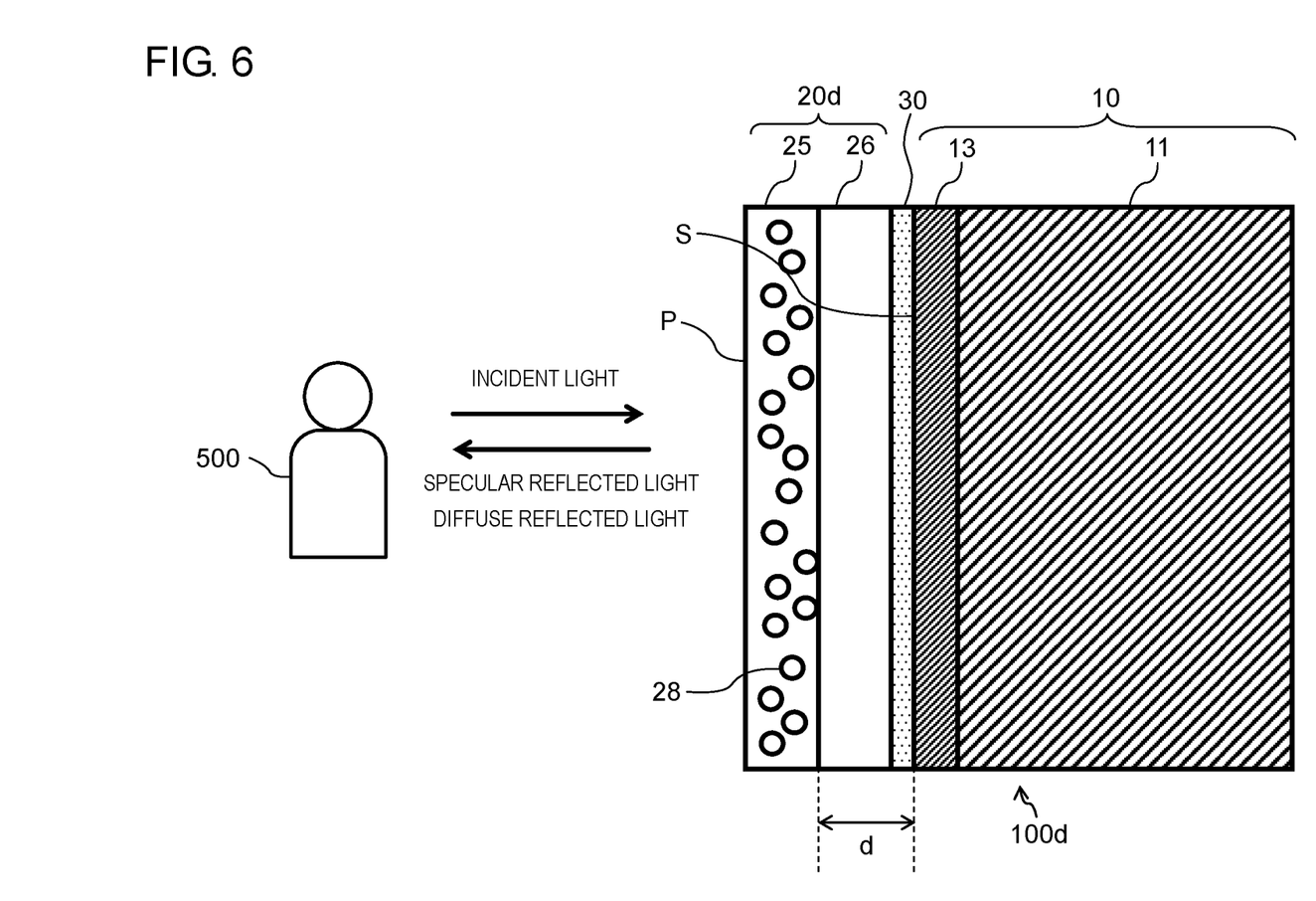
FIG. 6 is a view depicting a configuration of a mirror panel according to a second exemplary embodiment.

FIG. 6 is a view depicting a configuration of a mirror panel according to a second exemplary embodiment. Mirror panel 100d according to the second exemplary embodiment includes a transparent screen configured differently from the transparent screen according to the first exemplary embodiment. Transparent screen 20d (exemplifying the semitransmissive diffusion part) depicted in FIG. 6 includes transparent base material 26 and transmissive diffusion layer 25 provided on transparent base material 26. Transmissive diffusion layer 25 is made of a transparent medium including dispersed fine particles 28. In other words, transparent screen 20d includes transmissive diffusion layer 25 made of the transparent medium having dispersed fine particles 28. Transparent screen 20d and surface reflecting mirror 10 are bonded together via transparent adhesive layer 30.

Transmissive diffusion layer 25 is configured to transmit first part of incident light and causes fine particles 28 dispersed in transmissive diffusion layer 25 to diffuse second part of the incident light. Fine particles 28 and the transparent medium in transmissive diffusion layer 25 are differentiated in refractive index to achieve light diffusion. Transmissive diffusion layer 25 has visible light transmittance of 80% or the like.

Figure 7:
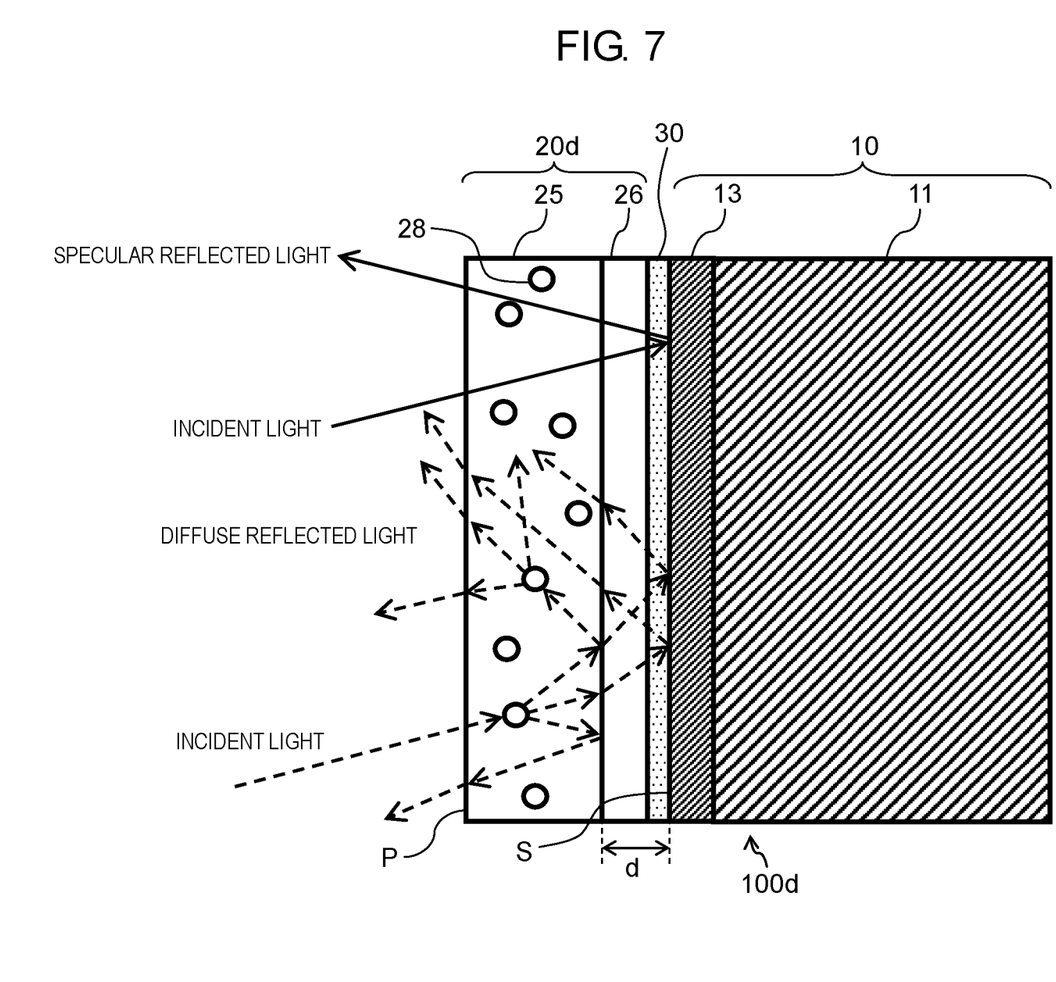
FIG. 7 is an explanatory view of an optical function of the mirror panel according to the second exemplary embodiment.

FIG. 7 is an explanatory view of an optical function of mirror panel 100d according to the second exemplary embodiment. First part of incident light to mirror panel 100d via incident surface P is linearly transmitted through transparent screen 20d and is specularly reflected at reflecting surface S of surface reflecting mirror 10. Fine particles 28 in transmissive diffusion layer 25 simultaneously diffuse second part of the incident light. First part of the diffused light is reflected at an interface between transmissive diffusion layer 25 and transparent base material 26. Second part of the diffused light is transmitted through transmissive diffusion layer 25 and transparent base material 26, is reflected at reflecting surface S, and enters transmissive diffusion layer 25 again. In other words, the part of the incident light diffused by fine particles 28 is reflected at the interface between transmissive diffusion layer 25 and transparent base material 26 or at reflecting surface S. The reflected light is emitted out of transparent screen 20d through incident surface P as diffusely reflected light. As described above, transmissive diffusion layer 25 has a function of linearly transmitting incident light and a function of diffusing and transmitting incident light. Provision of transmissive diffusion layer 25 in mirror panel 100d achieves specular reflection of first part of incident light and diffuse reflection of second part of the incident light.

First part of light entering mirror panel 100d according to the present exemplary embodiment is transmitted through transparent screen 20d and is specularly reflected at reflecting surface S, to allow user 500 directly facing mirror panel 100d to view his or her own reflected image. Second part of the light entering mirror panel 100d is diffusely reflected at transparent screen 20d, to allow user 500 to view projected image from projector 300 onto transparent screen 20d.

Projected image may be visually recognized as doubled images when transmissive diffusion layer 25 and reflecting surface S form long gap d in mirror panel 100d. Mirror panel 100d according to the present exemplary embodiment is configured such that transmissive diffusion layer 25 and reflecting surface S form gap d equal to or less than 3 mm in order for prevention of such doubled images (see FIG. 7).

Figure 8:
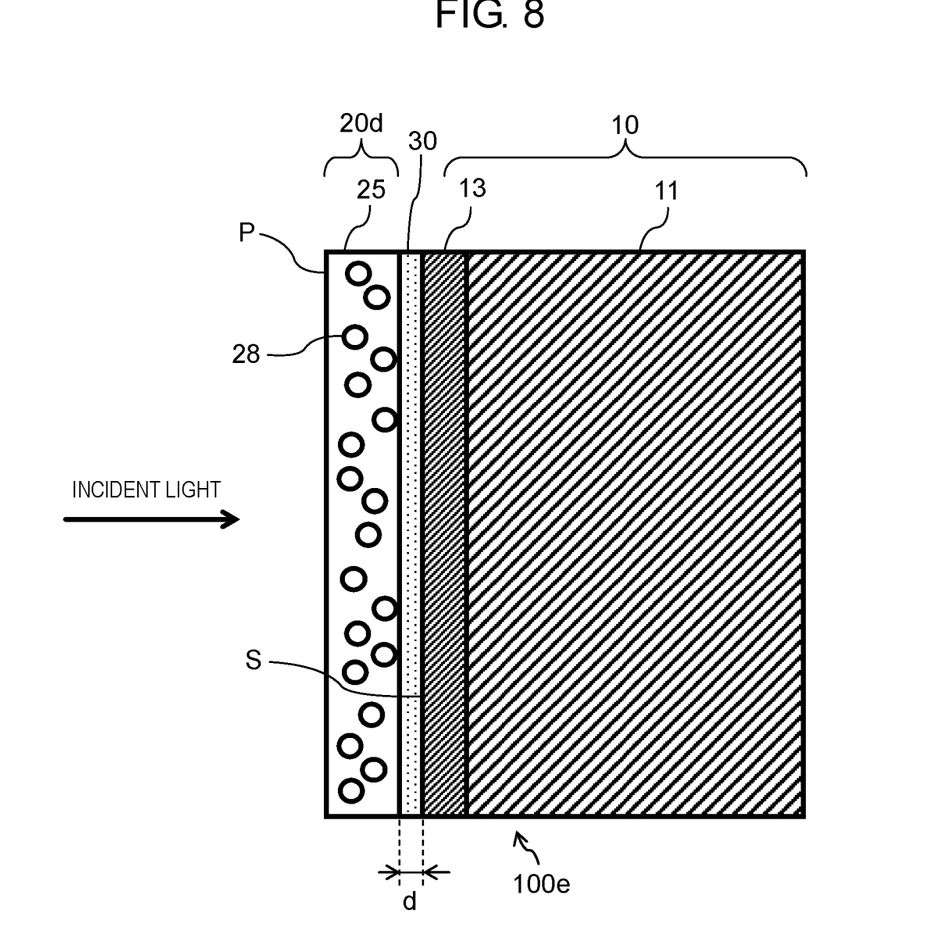
FIG. 8 is a view depicting another exemplary configuration of the mirror panel according to the second exemplary embodiment.

FIG. 8 is a view depicting another exemplary configuration of the mirror panel including the transparent screen having transmissive diffusion layer 25 according to the second exemplary embodiment. Transparent screen 20d in mirror panel 100e depicted in FIG. 8 does not include transparent base material 26, and transmissive diffusion layer 25 is bonded to reflecting layer 13 via adhesive layer 30. Mirror panel 100d depicted in FIG. 7 includes transparent base material 26 as a base material for provision of transmissive diffusion layer 25. In a case where transmissive diffusion layer 25 can be formed without provision of transparent base material 26, a mirror panel does not need to include transparent base material 26 as depicted in FIG. 8.

This configuration also achieves a mirror panel having translucency and diffuse reflectivity and configured to display a reflected image and projected image by a projector.

Transparent screen 20d according to the present exemplary embodiment may have visible light linear transmittance set to 50% or more, for example. This configuration achieves a clear reflected image.

Third Exemplary Embodiment

The above exemplary embodiments relate to exemplary configurations of a display system including a mirror panel. The display system may include a mirror film to be described later in place of the mirror panel. The mirror film will be described below. The mirror film may be 100 μm to 500 μm in thickness and be flexible.

Figure 9:
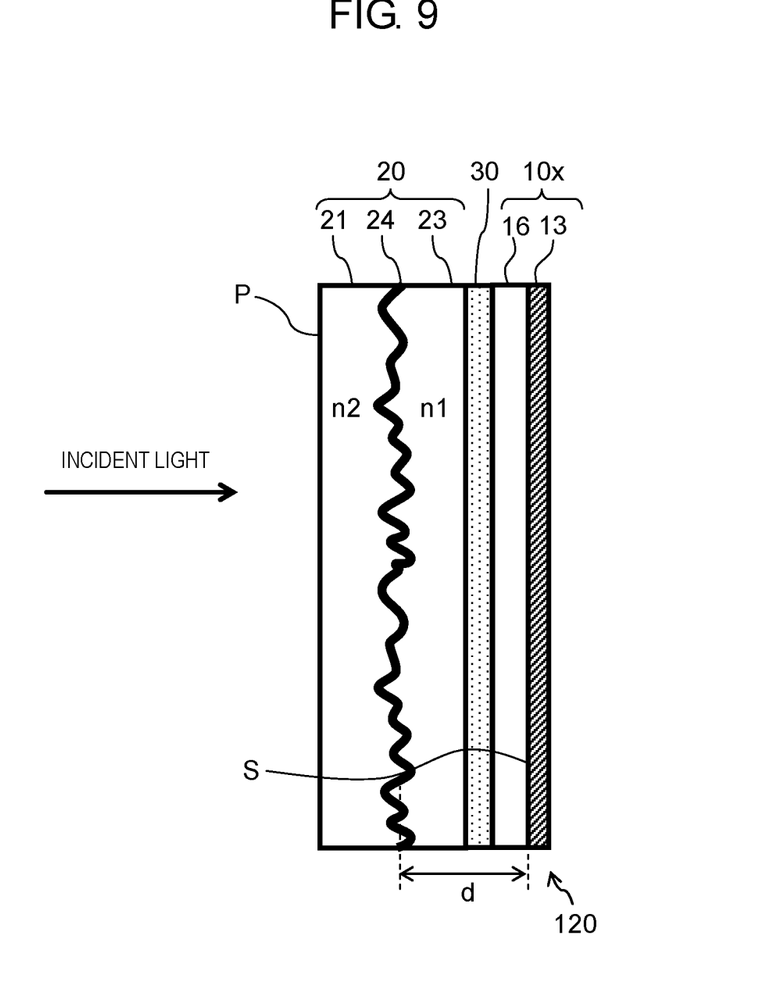
FIG. 9 is a view depicting a configuration of a mirror film according to a third exemplary embodiment.

FIG. 9 depicts a configuration of the mirror film. Mirror film 120 includes mirror part 10x, and transparent screen 20 disposed in contact with mirror part 10x. Mirror part 10x and transparent screen 20 are bonded together via transparent adhesive layer 30. Mirror part 10x includes transparent base material 16 and reflecting layer 13. As in the first exemplary embodiment, transparent screen 20 includes transparent uneven base material 21, semitransmissive reflecting layer (film) 24 provided along the uneven shape of uneven base material 21, and transparent medium layer 23.

Transparent base material 16 has a first main face bonded to transparent screen 20 via transparent adhesive layer 30, and a second main face provided with a metal film serving as reflecting layer 13. Reflecting layer 13 may be a film made of metal such as aluminum or silver by means of vapor deposition, sputtering, or the like.

Similarly to the mirror panel according to the first exemplary embodiment, mirror film 120 thus configured linearly transmits first part of light entering mirror film 120 through transparent screen 20 and specularly reflects the light at reflecting surface S. Second part of the light entering mirror film 120 is diffusely reflected at transparent screen 20. User 500 can thus simultaneously view a reflected image displayed at mirror film 120 and projected image on mirror film 120.

Semitransmissive reflecting layer 24 and reflecting surface S in mirror film 120 form gap d equal to or less than 3 mm, and reflecting surface S has reflectance of 70% or more, for example. Transparent screen 20 may have visible light linear transmittance set to 50% or more.

Figure 10:
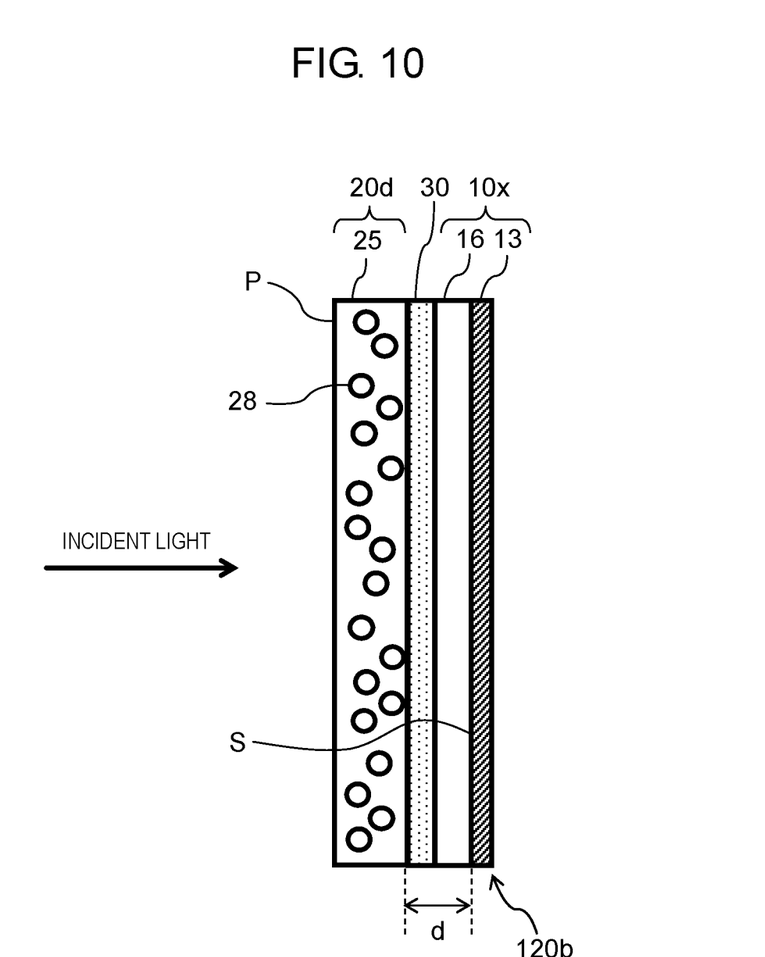
FIG. 10 is a view depicting another exemplary configuration of the mirror film according to the third exemplary embodiment.

The transparent screen can be configured as depicted in FIG. 9 or can be configured as in the second exemplary embodiment. FIG. 10 depicts a configuration of mirror film 120b including, for example, transparent screen 20d depicted in FIG. 8 as the transparent screen. This configuration also achieves specular reflection of first part of incident light and diffuse reflection of second part of the incident light. Also in this case, transmissive diffusion layer 25 and reflecting surface S form gap d equal to or less than 3 mm, and reflecting surface S has visible light reflectance of 70% or more, for example. Transparent screen 20d may have visible light linear transmittance set to 50% or more.

Mirror part 10x included in each of mirror films 120, 120b depicted respectively in FIG. 9 and FIG. 10 may not include transparent base material 16. Reflecting layer 13 is provided directly on transparent screen 20 in this case.

As described above, mirror film 120, 120b according to the present exemplary embodiment includes transparent screen 20, 20d (exemplifying the semitransmissive diffusion part) and reflecting surface S. Transparent screen 20, 20d is configured to diffuse first part of incident light via incident surface P and linearly transmit second part of the incident light. Reflecting surface S is disposed in contact with or adjacent to transparent screen 20, 20d, and reflects light transmitted through transparent screen 20, 20d toward transparent screen 20, 20d.

First part of light entering mirror film 120, 120b thus configured is linearly transmitted through transparent screen 20 and is specularly reflected at reflecting surface S. Second part of the light entering mirror film 120, 120b is diffusely reflected at transparent screen 20, 20d. User 500 can thus simultaneously view a reflected image displayed at mirror film 120, 120b and projected image on mirror film 120, 120b.

Fourth Exemplary Embodiment

A fourth exemplary embodiment will now be described with reference to FIG. 11.

Figure 11:
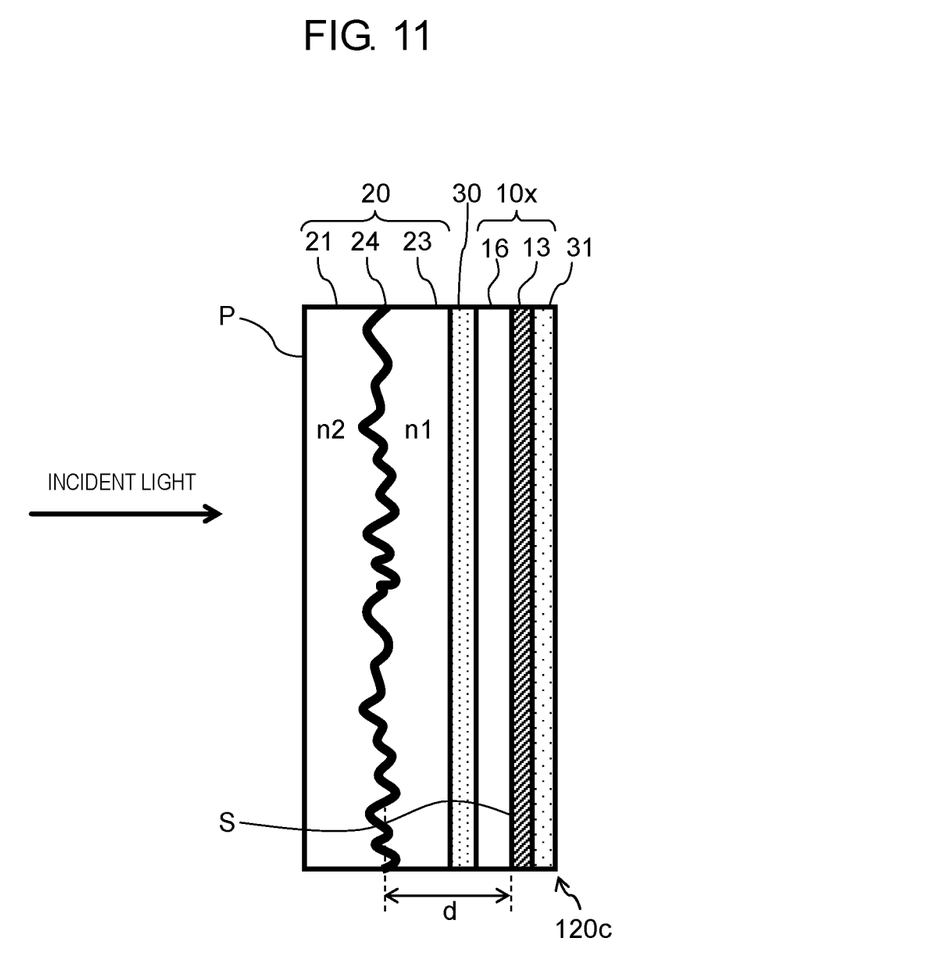
FIG. 11 is a view depicting a configuration of a mirror film according to a fourth exemplary embodiment.

FIG. 11 depicts still another configuration of the mirror film. Mirror film 120c depicted in FIG. 11 includes adhesive layer 31 as well as the configuration included in mirror film 120 depicted in FIG. 9. Adhesive layer 31 is disposed to oppose semitransmissive diffusion part 20 via reflecting surface S. Adhesive layer 31 according to the present exemplary embodiment is disposed in contact with reflecting layer 13. Adhesive layer 31 is made of an acrylic adhesive material or the like.

Mirror film 120c including adhesive layer 31 can be bonded to existing glass, mirror, or the like. Mirror film 120c having flexibility can be bonded to a curved surface of a cylindrical pillar or the like.

Mirror film 120b depicted in FIG. 10 can additionally include adhesive layer 31 similarly to mirror film 120c.

Other Exemplary Embodiments

The first to fourth exemplary embodiments are described above to exemplify techniques disclosed in the present disclosure. The techniques according to the present disclosure are not limited to the first to fourth exemplary embodiments, and are applicable to any exemplary embodiment achieved through appropriate modification, replacement, addition, removal, or the like. A new exemplary embodiment can also be made by combination of constituent elements described in the first to fourth exemplary embodiments.

The exemplary embodiments have been described to exemplify the techniques according to the present disclosure. The accompanying drawings and the detailed description are provided for this purpose.

The constituent elements depicted in the accompanying drawings and referred to in the detailed description may include constituent elements essential for solution to problems, as well as constituent elements not essential for solution to problems, in order for exemplification of the techniques. These unessential constituent elements should not be regarded as being essential just because the unessential constituent elements are depicted in the accompanying drawings or referred to in the detailed description.

The above exemplary embodiments are provided for exemplification of the techniques according to the present disclosure, and can thus have modification, replacement, addition, removal, or the like in various manners within the scope of the claims or equivalents of the claims.

INDUSTRIAL APPLICABILITY

The mirror panel and the mirror film according to the present disclosure can display a reflected image as well as projected image from a projector. The present disclosure is thus applicable to displaying projected image from a projector and superimposed on a reflected image.

REFERENCE MARKS IN THE DRAWINGS

10: surface reflecting mirror
10x: mirror part
11: base material
13: reflecting layer
16, 26: transparent base material
20, 20c, 20d: transparent screen (semitransmissive diffusion part)
21: uneven base material
23, 23c: transparent medium layer
24: semitransmissive reflecting layer
25: transmissive diffusion layer
28: fine particle
30, 31: adhesive layer
100, 100b, 100c, 100d, 100e: mirror panel
120, 120b, 120c: mirror film
P: incident surface
S: reflecting surface

The invention claimed is:

1. A mirror panel comprising:
a semitransmissive diffusion part configured to diffuse first part of incident light via an incident surface and linearly transmit second part of the incident light; and
a reflecting surface disposed in contact with or adjacent to the semitransmissive diffusion part, and configured to reflect light transmitted through the semitransmissive diffusion part toward the semitransmissive diffusion part,
wherein the semitransmissive diffusion part includes a first layer, a second layer and a semitransmissive reflecting layer having unevenness shape, the semitransmissive reflecting layer being located between the first layer and the second layer.

2. The mirror panel according to claim 1, wherein a surface of the first layer is shaped with unevenness.

3. The mirror panel according to claim 2, wherein the reflecting surface and the semitransmissive reflecting layer form a gap equal to or less than 3 mm.

4. The mirror panel according to claim 1, wherein the reflecting surface and the transmissive diffusion layer form a gap equal to or less than 3 mm.

5. The mirror panel according to claim 1, wherein the semitransmissive diffusion part has visible light linear transmittance of 50% or more.

6. The mirror panel according to claim 1, wherein the reflecting surface has visible light reflectance of 70% or more.

7. The mirror panel according to claim 1, further comprising a base material disposed to oppose the semitransmissive diffusion part via the reflecting surface.

8. A display system comprising:
the mirror panel according to claim 1; and
a projector configured to project image toward the incident surface in the mirror panel.

9. The mirror panel according to claim 1, wherein the semitransmissive reflecting layer is formed by metal provided on the surface of the first layer.

10. A mirror film comprising:
- a semitransmissive diffusion part configured to diffuse first part of incident light via an incident surface and linearly transmit second part of the incident light; and
- a reflecting surface disposed in contact with or adjacent to the semitransmissive diffusion part, and configured to reflect light transmitted through the semitransmissive diffusion part toward the semitransmissive diffusion part,
- wherein the semitransmissive diffusion part includes a first layer, a second layer and a semitransmissive reflecting layer having unevenness shape, the semitransmissive reflecting layer being located between the first layer and the second layer.

11. The mirror film according to claim 10, wherein a surface of the semitransmissive reflection layer is shaped with unevenness.

12. The mirror film according to claim 11, wherein the reflecting surface and the semitransmissive reflecting layer form a gap equal to or less than 3 mm.

13. The mirror film according to claim 10, wherein the reflecting surface and the transmissive diffusion layer form a gap equal to or less than 3 mm.

14. The mirror film according to claim 10, wherein the semitransmissive diffusion part has visible light linear transmittance of 50% or more.

15. The mirror film according to claim 10, wherein the reflecting surface has visible light reflectance of 70% or more.

16. The mirror film according to claim 10, further comprising an adhesive layer disposed to oppose the semitransmissive diffusion part via the reflecting surface.

17. A display system comprising:
- the mirror film according to claim 10; and
- a projector configured to project image toward the incident surface in the mirror film.

18. The mirror film according to claim 10, wherein the semitransmissive reflecting layer is formed by metal provided on the surface of the first layer.

* * * * *